Feb. 14, 1956  H. C. BROWN  2,734,272
SCRIBING OR ENGRAVING INSTRUMENT
Filed Aug. 27, 1954
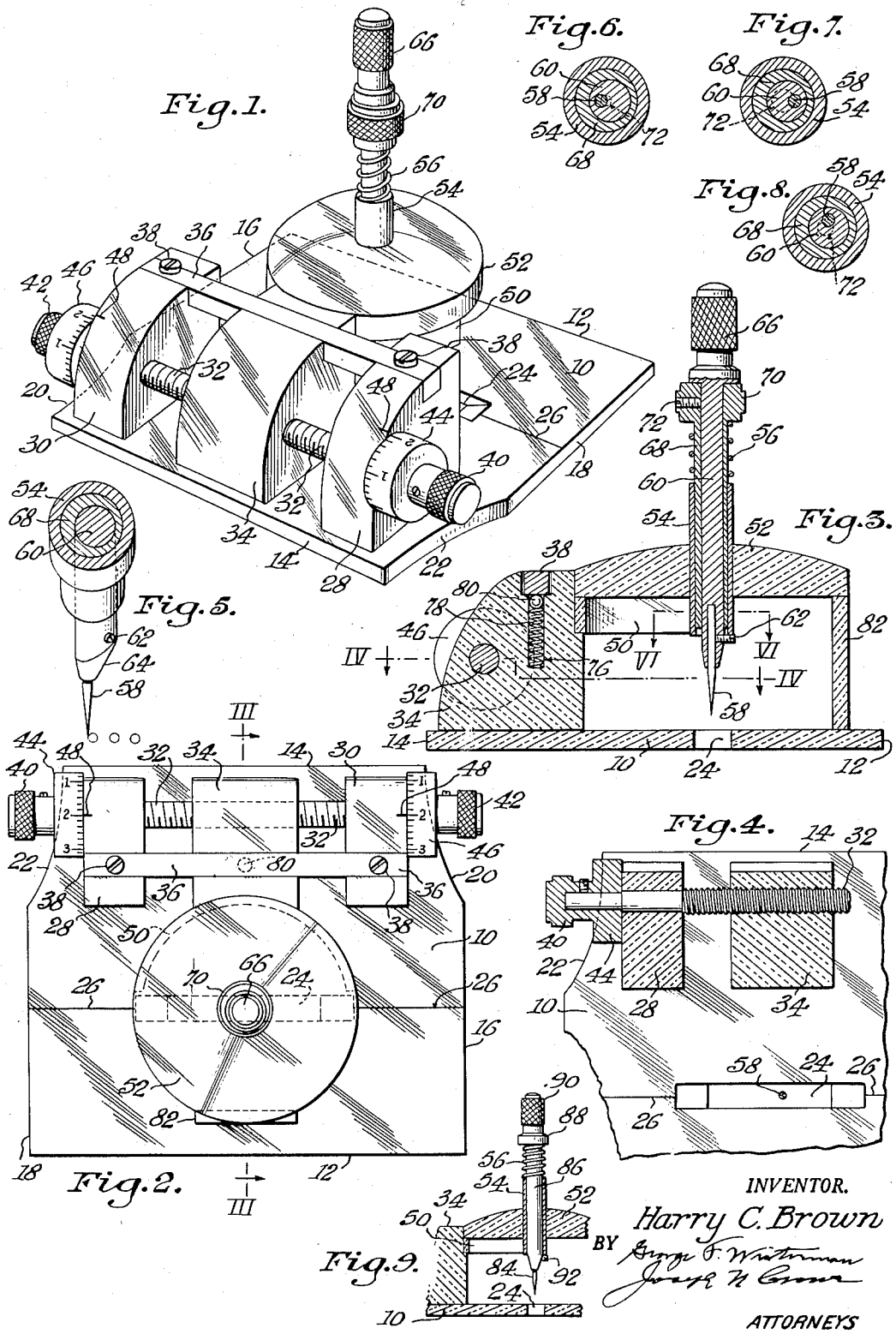
INVENTOR.
Harry C. Brown
BY
ATTORNEYS

United States Patent Office 2,734,272
Patented Feb. 14, 1956

2,734,272

SCRIBING OR ENGRAVING INSTRUMENT

Harry C. Brown, San Antonio, Tex.

Application August 27, 1954, Serial No. 452,739

7 Claims. (Cl. 33—27)

The invention described herein may be manufactured and used by or for the Government for governmental purposes, without payment to me of any royalty thereon.

The present invention relates to engraving instruments and particularly to such an instrument that is especially suitable for engraving details of topographic maps in a given work surface and which is designed for engraving dots or circles at a predetermined line weight and predetermined size, and also which is usable for engraving straight lines that likewise are of predetermined line weight.

The instrument of the present invention has particular application to operations performed by negative engravers in the proper recovery and portrayal of various map features or symbols. The engraving operation is performed by placing the instrument on a glass or plastic plate being engraved with the cutting tool (engraving stylus) centered vertically over the map feature or symbols, with a high degree of consistency in regard to dot or circle sizes, accurate positioning being reproducible quickly and whenever desired.

One method heretofore employed for accomplishing the general object of the present invention has been to make the dots and circles by utilizing a pen type scriber and templates made from brass shim stock of various thicknesses. The template is placed over the map feature or symbol to be recovered and engraved with the scriber. This method is open to an important objection due to the fact that the dots or circles contained in the template tend to become distorted in shape from the abrasive action of the scribing needle or stylus resulting in symbols of various sizes and shapes. Additionally, difficulty is encountered in holding the scriber needle accurately vertical, any failing to do so resulting in poor quality engraving.

It may be said, therefore, that the present invention has for a particular object the provision of an engraving instrument which accurately and expeditiously recovers and portrays the various map features or symbols which the plate may contain, whereby the map, upon reproduction, will have lines, dots, and circles of consistent line weights and sizes and which is accurately and quickly adjustable for accurately reproducing with exactitude such map features or symbols.

Further objects of the invention will become apparent as the description proceeds, and the features of novelty will be pointed out in particularity in the appended claims.

The invention will be understood more readily by reference to the accompanying drawings, in which—

Fig. 1 is a perspective view of an illustrative embodiment of an instrument including the present improvements;

Fig. 2 is a plan view thereof;

Fig. 3 is a transverse sectional elevation taken on the line III—III of Fig. 2, looking in the direction of the arrows;

Fig. 4 is a horizontal sectional view taken on the line IV—IV of Fig. 3, looking in the direction of the arrows;

Fig. 5 is a sectional perspective view of a form of stylus holder for use in the present instrument for engraving circles of selected adjusted diameters;

Fig. 6 is a horizontal view taken on the line VI—VI of Fig. 3, looking in the direction of the arrows, the view showing the position of the stylus in the holder for scribing or engraving a circle of smallest diameter as indicated by the dotted lines on the view;

Fig. 7 is a view similar to Fig. 6, but illustrating the positions of the stylus and elements of the stylus holder for producing a circle of maximum size, as in indicated by the dotted line on the view;

Fig. 8 is a view similar to Figs. 6 and 7, but showing the relative position of the parts of the stylus assembly for producing a circle of an intermediate diameter between those of Figs. 6 and 7, as indicated by the dotted line of the view; and Fig. 9 is a fragmentary view somewhat similar to Fig. 3, but showing a modified form of stylus and holder therefor wherein the stylus is non-adjustably mounted in its holder, which assembly, however, is interchangeable with the adjustable stylus and holder of the preceding views.

Referring more particularly to the drawings, the present instrument is composed essentially of suitably molded elements composed predominantly of a transparent synthetic "plastic" of a vinyl polyalkylmethacrylate type. The instrument comprises a flat base 10 having a front surface 12, a rear surface 14, and opposite sides 16 and 18, which may be beveled inwardly and rearwardly, as has been indicated at 20 and 22 for enhanced convenience in holding the instrument in position for use, as well as giving an enhanced pleasing appearance to the instrument. The base 10 is provided intermediate its sides and approximately equally spaced between its front and rear edges 12 and 14, with a longitudinal slot 24 from which extends accurately aligned guide lines 26 from the longitudinal center line of the slot 24 to the sides 16 and 18 of the base 10.

Adjacent to each of the rearward side portions of the base 10 are upstanding bearing brackets 28, 30, which rotatably receive a micrometer-type screw 32 on which is mounted threadedly a movable bracket 34, which is internally threaded in mesh with the threads of screw 32. The adjustably movable bracket 34 travels along the screw 32, responsively to rotary movements of the latter, through the intervening space between the brackets 28 and 30.

These end bearing brackets 28 and 30 are recessed at their tops for the reception of a metallic slide bar 36, which is attached to the said end brackets by screws, or the like, 38. The micrometer screw 32 is actuated by manually turning either of its knurled heads 40, 42, one of which is at each end of the screw 32, as is also a graduated collar 44, 46, the graduations on which are equal in spacing and, in conjunction with a guide line 48 on each end bracket, enable a rapid adjustment of the screw and hence the traveling bracket 34 to any desired position relative to the base 10.

The movements of the traveling bracket 34 are guided by the fixed bar 36, and this bracket 34 mounts an approximately semicircular mounting 50 which, in conjunction with the bracket 34, carries a magnifying lens 52, in which is mounted concentrically and vertically, a metallic outer or bearing sleeve 54 which is positioned accurately at the vertical axis of the lens 52 and which has sufficient thickness so that its upper end forms a seat for a lightly compressed coil spring 56 for the engraving stylus assembly.

This stylus assembly comprises an engraving stylus or needle 58 which is secured in a holder element 60 but offset axially therefrom, the stylus 58 being held by a set screw 62 adjacent to the lower end of the holder 60, which may be beveled into a cam surface 64 for affording greater visibility of the stylus 58 to an operator.

The stylus holder 60 terminates in a knurled operating head 66 which is used for turning the holder 60 and its enclosing sleeve 68 relative to the outer bearing sleeve 54, this last-mentioned element being mounted rigidly and axially in lens 52, as has been mentioned above. This sleeve 68 is eccentrically disposed relative to the stylus holder 60 and terminates at its upper end in an enlarged collar 70 which receives a locking screw 72, which engages the stylus holder 60 and interlocks the stylus holder with the sleeve 68. The collar 70 also forms the top abutment for the coil spring 56, which is compressed sufficiently between the collar 70 and the upper end of the outer bearing sleeve 54 so as to hold normally the stylus 58 elevated out of the slot 24 in the base plate 10 of the instrument, while at the same time enabling the stylus to be pressure-inserted in the slot 24 and against a work-piece positioned under the base plate 10. In practice, the eccentricity of sleeve 68 relative to the outer bearing sleeve 54 and to the stylus holder 60, is such as to permit an operator to engrave circles from approximately 0.001 to approximately 0.080 inch in diameter, by way of illustrative example, as is indicated by dotted lines 72 in Figs. 6, 7, and 8.

In operation, the operator or engraver readily can adjust the radius of the stylus assembly by loosening the lock screw 72, which thus permits either enlargement or retraction of the stylus holder 60 relative to its sleeve 68 and also relative to the outer bearing sleeve 54, the loosening of the lock screw 72 permitting the desired turning of the stylus holder 60 in its sleeve 68 to a desired selected position, then after tightening the lock screw 72, the operator is furnished with the size of dot or circle desired for engraving; and by appropriate manipulation of screw 32 towards the right or left, a series of such dots or circles in accurate alignment will be obtained as the bracket 34 correspondingly moves along the screw. Further, in the event that it is desired to vary the dot or circle line weights, there is required only the substitution of a selected stylus which is accomplished by loosening the lock screw 62, thereby releasing the stylus 58 for replacement, or by sharpening the point of the stylus 58 to the line weight desired. This lock screw 62 also restrains complete displacement of the stylus holder 60 and its eccentric sleeve 68 from the bearing sleeve 54 while the screw 62 is in locking position against the stylus 58, loosening of screw 62 until it is removed enabling such complete removal of the stylus holder 60 and its eccentric sleeve 68 from bearing sleeve 54 for replacement thereof with another stylus assembly such as that shown in Fig. 9, wherein the stylus holder 74 is mounted rigidly and concentrically for straight-line engraving responsively to actuation of screw 32.

It may be noted that the movable bracket 34 may be recessed as indicated at 76 for receiving a coil spring 78 which may be provided for maintaining an anti-friction bearing 80 against the under-surface of slide bar 36. It will be understood also that the thickness and curvature (convexity) of the lens member 52 is dependent upon the amount of magnification of the lines being engraved that is desired. Also, if found to be desirable, a peripheral support 82 may be provided for the lens 52, and which may be secured to the lens for adjustable movement therewith relative to the base 10.

It has been pointed out above that the stylus holder assembly is held frictionally in the outer sleeve 54 and, upon removal of locking screw 62, such assembly may be removed entirely from the sleeve 54 for interchangeable replacement by another similar assembly, or by a modified assembly such as that shown by Fig. 9, by way of example. In such modified form of assembly the eccentric sleeve 68 enclosing the stylus holder element 60 is omitted with elimination of the cam-surfaced tip 58, the stylus 84 being mounted in holder 86 which corresponds generally to the holder element 60 of the precedingly described assembly. The holder 86 has an upper abutment collar 88 thereon and a knurled operating head 90, the collar 88 serving as a compressional seat for the spring 56 in the same manner as does the collar 70 of the above-described modification, so that normally the stylus 84 is held elevated above the workpiece, but is engageable therewith upon application of sufficient finger pressure on operating head 90 for overcoming the pressure of spring 56. The assembly illustrated in Fig. 9 is useful for engraving dots or straight lines, and it may be released for bodily removal from the outer tubular sleeve 54 by removal of locking screw 92 as will be apparent.

Having thus described my invention, what I claim as new and wish to secure by Letters Patent is:

1. An engraving instrument comprising in combination, a base plate having a front surface, a rear surface and opposite side surfaces, spaced lateral bearing brackets upstanding from the base plate rearwardly thereof and adjacent to the side surfaces, a micrometer screw extending through the lateral bearing brackets and rotatably mounted therein, an adjustable carriage threadedly mounted on the screw intermediate the bearing brackets and movable along the screw longitudinally thereof responsively to rotation of the screw, a mounting bracket extending horizontally from the carriage and movable therewith, a substantially horizontal magnifying lens carried by the mounting bracket, an outer tubular sleeve member extending vertically through the lens substantially centrally thereof and permanently mounted therein, and an engraving assembly mounted in the said outer tubular sleeve member and including a stylus-holding member for receiving an engraving stylus, an inner tubular sleeve receiving and enclosing the stylus-holding member, the said inner sleeve and stylus holder being received in the outer tubular sleeve member mounted in the lens, an enlarged collar on the inner sleeve, an engraving stylus mounted in the holder, and a coil spring compressionally mounted between the outer tubular sleeve and the enlarged colar on the inner sleeve for normally holding the engraved stylus elevated out of engagement with the base and underlying work, the said base being provided with an elongated slot beneath the stylus and at least coextensive in length with length of movement of the adjustable carriage along the micrometer screw, the said slot extending through the base and providing access of the stylus through the base to work underlying the base.

2. An engraving instrument comprising, in combination, a base plate having a front surface, a rear surface, and opposite side surfaces, spaced lateral bearing brackets upstanding from the base plate rearwardly thereof and adjacent to the sides, a micrometer screw extending through the lateral bearing brackets and rotatable therein, an adjustable carriage movably mounted on the screw intermediate the bearing brackets and shiftable along the screw responsively to rotation of the screw, a reinforcing guide bar rigidly secured to upper portions of the bearing brackets and bridging the space therebetween, the adjustable carriage having an upper guide channel engaging the said guide bar, a mounting bracket extending horizontally forwardly from the carriage and movable therewith, a substantially horizontally disposed magnifying lens peripherally mounted on the bracket, an outer tubular sleeve member extending vertically through the lens substantially centrally thereof, and an engraving assembly mounted in the outer tubular sleeve member and longitudinally slidable therein, the said engraving assembly comprising an engraving stylus, a holder for the stylus, an inner sleeve enclosing the stylus-holder, the inner sleeve being rotatably received in the outer sleeve member and provided with an actuating collar, a coil spring compressingly abutting against the actuating collar and an adjacent end of the outer tubular sleeve member and continuously urging the collar and inner sleeve outwardly away from the outer tubular sleeve member for normally maintaining the stylus elevated above the base and a workpiece beneath the base, means releasably interlocking the stylus holder and inner sleeve, and additional means releasably securing the stylus in the holder while coacting with both the inner sleeve and the outer sleeve member for preventing complete displacement of the stylus holder and inner sleeve from the outer sleeve, and a knurled operating head on the stylus holder for enabling inward displacement of the stylus holder and inner sleeve relative to the outer sleeve and against pressure of the spring for engaging the stylus with a workpiece, the base plate having an elongated slot therein corresponding in length to total distance traveled by the carriage along the guide bar responsively to rotation of the micrometer screw, the said slot extending through the base plate and providing access of the stylus to the workpiece underlying the base plate.

3. The engraving instrument of claim 2 wherein the engraving assembly is removable completely from the outer tubular sleeve for interchangeable replacement with another selected similar assembly.

4. The engraving instrument of claim 2 wherein the actuating collar of the engraving assembly is secured to the stylus holder and the coil spring is seated on the outer tubular sleeve and bearing against the said actuating collar for normally maintaining the stylus in elevated inoperative position.

5. The engraving instrument of claim 2 wherein the inner sleeve eccentrically encloses the holder for the stylus, the holder for the stylus and sleeve being relatively turnably adjustable responsively to release of the said means releasably interlocking the inner sleeve and the holder for the stylus for engraving circles of selected diameters in a workpiece.

6. The engraving instrument of claim 5 wherein the eccentric inner sleeve is provided with an enlarged finger-operable collar and the said means releasably interlocking the inner sleeve and holder for the stylus being a locking screw extending into the collar in normal locking engagement with the holder for the stylus.

7. The engraving instrument of claim 6, wherein the holder for the stylus is provided with a lower cam-surfaced end extending below the eccentric inner sleeve with an engraving stylus mounted in the said end, and the additional means releasably securing the stylus in its holder engages both the eccentric sleeve enclosing the stylus holder and also the outer sleeve for preventing complete removal of the stylus holder and its eccentric sleeve from the outer sleeve pending removal of the releasable locking means.

References Cited in the file of this patent

UNITED STATES PATENTS

| | | |
|---|---|---|
| 647,064 | Baashuus | Apr. 10, 1900 |
| 1,449,422 | Langa | Mar. 27, 1923 |
| 2,455,372 | Leeper | Dec. 7, 1948 |
| 2,455,972 | Bowditch | Dec. 14, 1948 |
| 2,553,600 | Mattare | May 22, 1951 |